(12) United States Patent
Withers et al.

(10) Patent No.: US 7,914,600 B2
(45) Date of Patent: Mar. 29, 2011

(54) CONTINUOUS PRODUCTION OF TITANIUM BY THE METALLOTHERMIC REDUCTION OF TICL$_4$

(75) Inventors: James C. Withers, Tucson, AZ (US); Raouf Loutfy, Tucson, AZ (US)

(73) Assignee: Materials & Electrochemical Research Corp., Tucson, AZ (US)

( * ) Notice: Subject to any disclaimer, the term of this patent is extended or adjusted under 35 U.S.C. 154(b) by 457 days.

(21) Appl. No.: 12/013,307

(22) Filed: Jan. 11, 2008

(65) Prior Publication Data

US 2008/0173131 A1    Jul. 24, 2008

Related U.S. Application Data

(60) Provisional application No. 60/886,050, filed on Jan. 22, 2007.

(51) Int. Cl.
    *B22F 9/28* (2006.01)
(52) U.S. Cl. ............................. 75/366; 75/368
(58) Field of Classification Search .................... 75/368, 75/369
    See application file for complete search history.

(56) References Cited

U.S. PATENT DOCUMENTS

| | | | |
|---|---|---|---|
| 2,287,122 A | 6/1942 | Norris | |
| 3,039,866 A | 6/1962 | Takeuchi | |
| 3,135,599 A | 6/1964 | Heidt et al. | |
| 3,595,541 A * | 7/1971 | Pabich et al. | 423/175 |
| 3,801,307 A * | 4/1974 | Hurd | 75/395 |
| 4,032,328 A | 6/1977 | Hurd | |
| 4,285,724 A * | 8/1981 | Becker et al. | 75/368 |
| 4,401,467 A | 8/1983 | Jordan | |
| 4,445,931 A | 5/1984 | Worthington | 75/0.5 B |
| 4,556,420 A * | 12/1985 | Evans et al. | 75/618 |
| 4,877,445 A | 10/1989 | Okudaira et al. | 75/0.5 B |
| 5,259,862 A * | 11/1993 | White et al. | 75/363 |
| 6,210,461 B1 * | 4/2001 | Elliott | 75/344 |
| 6,852,243 B2 | 2/2005 | Jurgensen et al. | |
| 6,955,703 B2 * | 10/2005 | Zhou et al. | 75/351 |

FOREIGN PATENT DOCUMENTS

| | | |
|---|---|---|
| EP | 0298698 | 1/1989 |
| GB | 736852 | 9/1955 |
| WO | WO-2006/010223 A1 * | 2/2006 |
| WO | WO-2006/042360 A1 * | 4/2006 |

OTHER PUBLICATIONS

Hansen & Gerdemann, "Producing Titanium Powder by Continuous Vapor-Phase Reduction", Light Metals, JOM, Nov. 1998, pp. 56-58.
Blenkinsop et al., "Proceedings of the Eighth World Conference on Titanium Held at the International Convention Centre", Titanium '95 Science & Tech, pp. 1535-1542.

* cited by examiner

*Primary Examiner* — George Wyszomierski
(74) *Attorney, Agent, or Firm* — Hayes Soloway P.C

(57) ABSTRACT

A method for production of titanium particles or other metal of interest by a metallothermic reduction reaction of TiCl$_4$ or other metal chloride in a reaction zone which comprises conducting the reaction in a fluidized bed reaction zone, and recycling particles to the reaction zone to build up particle size.

28 Claims, 4 Drawing Sheets

CONTINUOUS PRODUCTION OF TITANIUM BY THE METALLOTHERMIC REDUCTION OF TICL$_4$

CROSS REFERENCE TO RELATED APPLICATIONS

This application claims priority from U.S. Provisional Application Ser. No. 60/886,050, filed Jan. 22, 2007.

BACKGROUND OF THE INVENTION

This invention relates to the production of metals. The invention has particular utility in connection with the production of titanium and will be described in connection with such utility although other utilities are contemplated.

DESCRIPTION OF THE PRIOR ART

Substantially all the titanium produced throughout the world utilizes the magnesium reduction of titanium tetrachloride (TiCl$_4$) which is known as the Kroll process. The reaction is $2 Mg_{(l)} + TiCl_{4(g)} = Ti_{(s)} + 2MgCl_{2(l)}$. The process is typically carried out by bubbling TiCl$_4$ gas above liquid magnesium in a closed container operated at approximately 800-1000° C. (typically 900° C.). Large steel containers are used to contain the molten magnesium in the absence of air. As the reaction proceeds, the magnesium chloride by-product is in a liquid state which is drained from the steel container. The titanium produced is in a sponge like morphology in a solid block. After substantially all the magnesium is consumed by the gaseous TiCl$_4$, the process is stopped and the solid titanium sponge is removed from the steel container after cooling to room temperature. The titanium sponge is broken up with jack hammers and separated into fractions, as the sponge in the bottom, sides, top and middle will exhibit different particulate size, shape and purity. This batch process is very labor intensive and the product titanium is not uniform. It has long been sought to produce the titanium continuously and all product exhibit uniformity. The Kroll process to produce titanium has been practiced for approximately 50 years and no processing has emerged for continuous operation.

Others have investigated utilizing the fluid-bed concept to produce titanium. Hansen et al JOM, Nov. 1998, pgs. 56-58 report producing very small titanium particles substantially less than 1 micron in diameter which cannot be exposed to the atmosphere without excessive oxygen pick-up or even explosion. However, new titanium did not form or deposit on existing particles as it was stated the by-product MgCl$_2$ condensed and coated the titanium particles that prevented any new growth on the particle at operation temperatures of 1000° C. Higher operation temperatures of 1500° C. to vaporize the MgCl$_2$ above its boiling point of 1412° C. failed to produce useable titanium particles in the Hansen fluid-bed reactor. Hansen suggested titanium particles greater than 5 micron in diameter are necessary to prevent oxygen pick-up greater than acceptable to meet ASTM specifications.

Tisdale et al, in Titanium '95 Science and Technology, pgs. 1535-1542 report the vapor phase reaction of Mg and TiCl$_4$ at temperatures of 1150° C. to 1425° C. Large excesses of Mg were required to prevent formation of TiCl$_3$ instead of or in addition to titanium. A high residence time of several seconds was required to provide the Mg sufficient time to fully reduce the TiCl$_4$ all the way to titanium. The rates of the vapor phase reaction were five times that reported for the conventional Kroll reaction. Tisdale et al report producing both titanium particles as well as solid plating of titanium on hot surfaces. Small particle sizes were produced that required vacuum distillation to prevent oxygen pick-up from water washing or leaching to remove the by-product MgCl$_2$ which lead Tisdale et al to suggest alternative methods were necessary to increase particle size to permit production of commercially viable titanium powder. The small particle size and solid plating results of Tisdale et al does not lend itself to continuous processing of commercially viable titanium.

British Patent No. 736,852, reports utilizing sodium, potassium or magnesium vapors to reduce TiCl$_4$ vapors in a variety of apparatuses that produced spongy and molten titanium on the walls of the reactor chamber and the reducing metal halide by-product. However, continuous process of producing titanium powder was not achieved.

Worthington in U.S. Pat. No. 4,445,931 report molten sodium droplet sprayed into a vapor of TiCl$_4$ to produce titanium powder with NaCl by-product which was stated could be practiced on a continuous basis.

Okudaira, et al in U.S. Pat. No. 4,877,445 report utilizing a fluid-bed seeded with titanium particles to which was fed vapors of magnesium and TiCl$_4$ operated at 50 Torr pressure and 1100° C. The low pressure and high temperature is said to cause vapor phase reaction of the Mg and TiCl$_4$ to produce titanium that grows onto the seeded titanium particles. The vapor pressure of the by-product MgCl$_2$ is said to be 86 Torr which prevents condensing on the depositing titanium particles which allows them to build up in size. According to Okudaira et al the reactor is kept at a lower pressure to prevent any residual condensation of the by-product MgCl$_2$ into pores of the titanium particles. This lower pressure in the reactor prevents any flow of produced titanium particles to a higher pressure container as alleged and shown in the drawing as well as contradicts that the larger titanium particles would exit a tube on the high side of the reactor in the illustration. The higher pressure in the outside container would prevent particles from flowing from a low to high pressure and the larger titanium particles would settle in the bed and not reach an exit tube located somewhere up the side of the reactor as shown in the illustration. Maintaining the reaction vessel at 1100° C. or above and a reduced pressure of 50 Torr could cause the reactor vessel to collapse if there is insufficient strength in the metal vessel at the low pressure and high temperature to prevent the vessel collapsing.

According to Okudaira et al only a small amount of titanium was produced on the walls of the reactor without the use of titanium particles as a seed in the bed. Since Okudaira et al requires titanium particle seeds in a fluid-bed in order to obtain deposition onto the seeds, the system is not continuous as the bed requires emptying when sufficient build up has occurred and a new seed put into place for new deposition and build up of the particles.

BRIEF DESCRIPTION OF THE INVENTION

To achieve low cost production of titanium the process must be continuous and provide high production of titanium per unit volume of reactor. Another criteria is that no condensed liquid or solid phase interfere with the nucleation and growth of the only allowable solid phase titanium particles in the reaction zone. These criteria have been met through unique design of reaction zones that don't require seeds to initiate the growth of particles but which provide for the build up of large titanium particles that eliminate high oxygen pick-up when exposed to air, and most importantly operation on a continuous basis to effect low cost production of titanium particulate. More particularly, in accordance with the present invention, there is provided a method for production of titanium particles by metallothermic reduction reaction of $TiCl_4$ in a reaction zone which comprises conducting the reaction in a fluidized bed reaction zone, and recycling particles to the reaction zone to build up particle size.

Alternatively, gaseous $TiCl_4$ and Mg may be reacted in a molten salt reactor wherein titanium will be produced either in particulate form or molten form, depending on the temperature of the molten salt.

BRIEF DESCRIPTION OF THE DRAWINGS

Further features and advantages of the subjection invention will be seen from the following detailed description, taken in conjunction with the accompanying drawings, wherein like numerals depicts like parts, and wherein.

DETAILED DESCRIPTION OF THE INVENTION

The present invention provides processes for the continuous synthesis of titanium by magnesium reduction of $TiCl_4$ in the gaseous state. One embodiment of the invention titanium is produced continuously by mixing magnesium in the vapor or gaseous state with $TiCl_4$ vapor or gas in a particulate bed in which the particles are continuously in motion to avoid particle-to-particle agglomeration. In another embodiment of the invention magnesium in the vapor or gaseous state is mixed with $TiCl_4$ vapor or gas in a high temperature molten salt such as calcium fluoride ($CaF_2$). Depending on the operating temperature of the molten salt such as $CaF_2$, the titanium can be produced as a solid particulate or if the molten salt is operated above the melting point of titanium which is approximately 1670° C., the titanium will be produced in a molten or liquid state.

Figure 1:
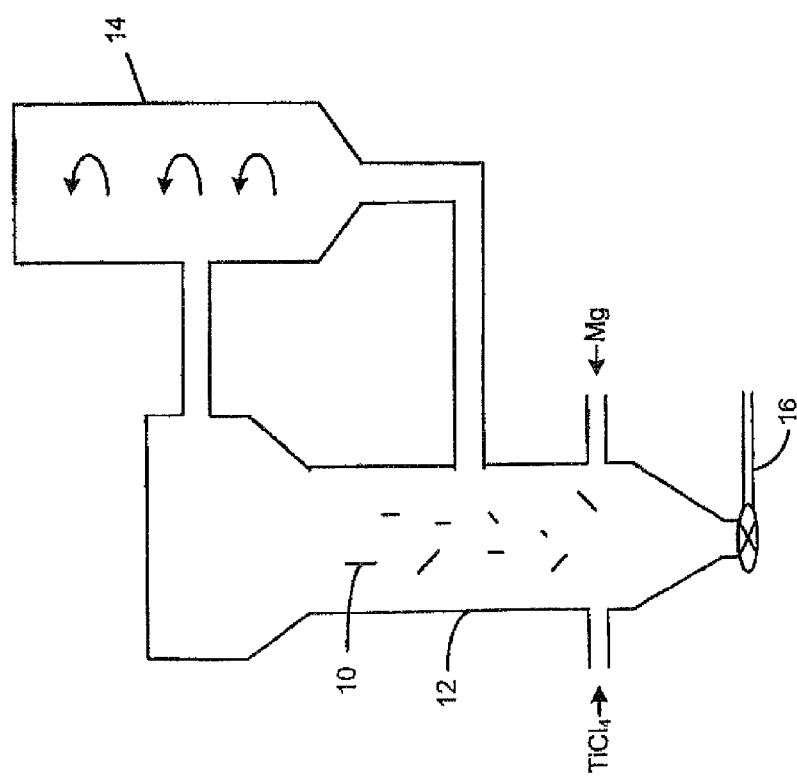
FIG. 1 is a cross-sectional view illustrating a fluid-bed reactor for practicing the present invention.

Referring to FIG. 1, in accordance with one embodiment of the invention, $TiCl_4$ and Mg vapors are introduced into the reaction zone 10 a fluid-bed reactor 12 where they react with homogenous nucleation that produces small particles, typically under one micron, which are collected in a series of cyclones 14 designed to collect such small particles at the velocity of the reactor gas flow. The small particles are recycled into the fluid-bed reactor reaction zone 10 where they are built up through additional deposition from $TiCl_4$ and Mg vapor reaction. Recycle is continued until the particles grow to a desirable size range of, for example, 40 microns to 300 microns. As the particles become larger, they become heavier and settle to the bottom of the reactor, where they can be extracted by gravity flow through a pipe 16 connected to the bottom of the fluid bed reactor. Thus, the formation of titanium in the reactor zone 10 is continuous and extraction of select size particles of titanium becomes continuous which results in low cost production of titanium.

Figure 2:
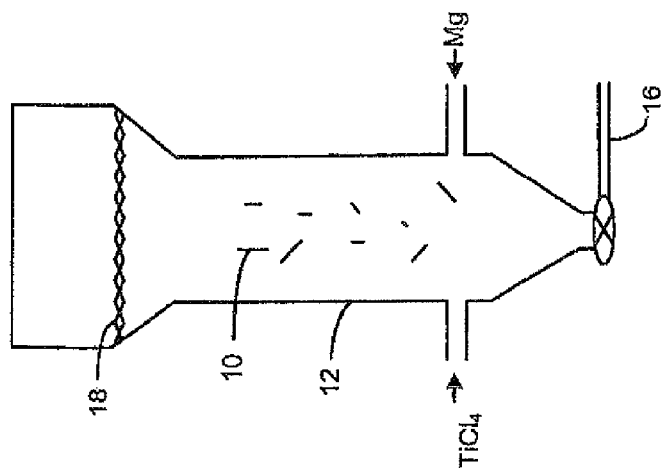
FIG. 2 is a view similar to FIG. 1 showing an alternative fluid-bed reactor for practicing the present invention.

As an alternative to collecting the small homogenously nucleated titanium particles in a fluid-bed by cyclones we can utilize screens 18 over the top of the bed (see FIG. 2) which prevent the particles from exiting, and vibrating the screen so that the small particles fall back into the reaction zone 10 which permits additional deposition until the particles are built up to a desired size. As before, as the particles become larger, they become heavier and settle in the bottom of the reactor, where they can be extracted by gravity flow through a pipe 16 connected to the bottom of the fluid-bed reactor. Preventing small particles from escaping from the reactor through the use of a fine screen 18 that causes the small particles to return into the reaction zone 10 permits the particles to be built up to a select size that are drained off from the bottom of the reactor thus permitting the fluidized-bed to be operated on a continuous basis.

With small particles being initially produced in a fluid-bed and deposition building up larger particles that also must be fluidized or a least bumped to move sufficiently to prevent particles from agglomerating, in order to maintain a gas flow through the fluid-bed that does not blow small particles out of the reactor yet keep moving the larger particles, in a preferred embodiment of the invention we have found it desirable to pulse the gas flow. That way we can keep the larger particles from agglomerating, while not blowing the small particles out of the reactor. Thus, by pulsing the gas flow, coupled with screening and/or cyclones separation to return the small particles to the reaction zone, continuous deposition and build up of the particles, is achieved, whereupon the system can be operated continuously.

Figure 3:
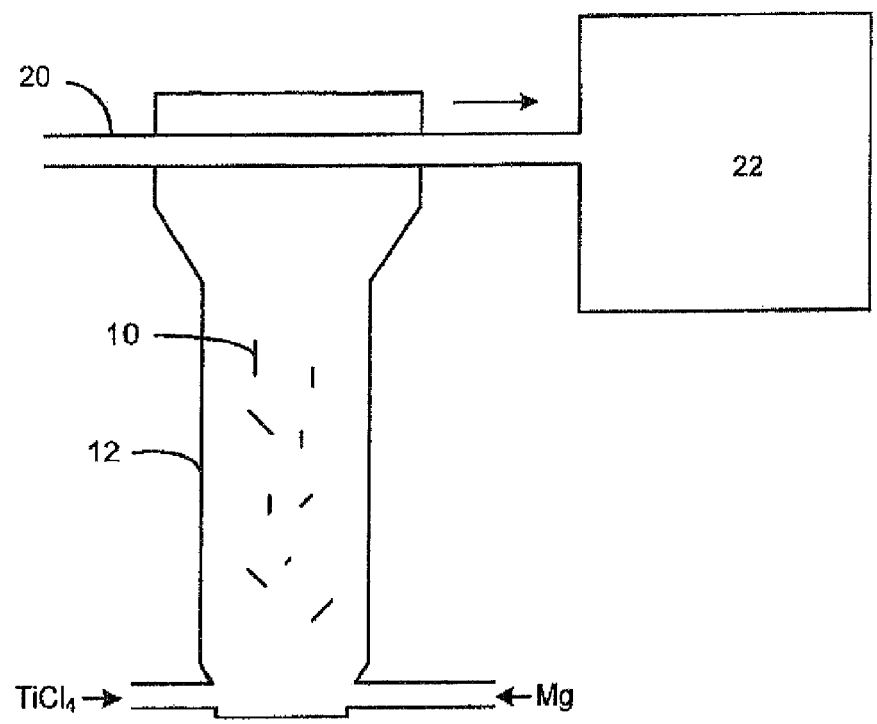
FIG. 3 is a schematic view showing yet another embodiment of the present invention.
Figure 4:
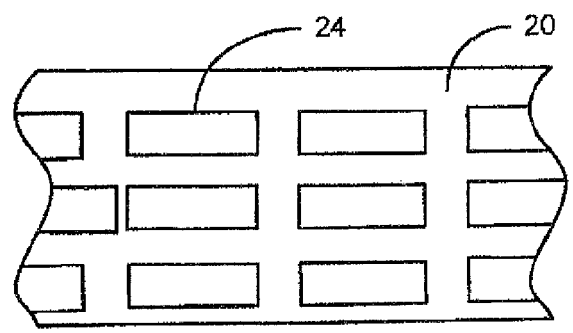
FIG. 4 is a cross-sectional view showing details of substrate useful in the practice of the FIG. 3 embodiment.
Figure 5:
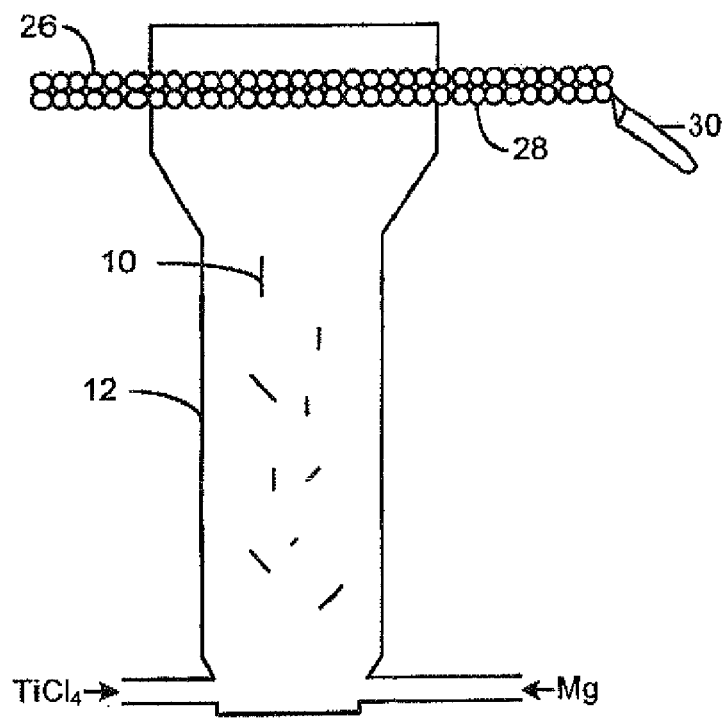
FIG. 5 is a schematic view showing yet another embodiment of the present invention.

Alternatively, since the gas flow in a fluidized-bed can present a problem with maintaining idealized fluidization with diverse particle sizes in the bed, another possibility, illustrated in FIG. 3 is to deposit the titanium onto a substrate 20 having a desired geometric shape that produces the desired particle morphology. The substrate 20 is moved through the reaction zone 10 and the deposited titanium can then be removed from the deposition surface by scraping and/or flexing or bending at release station 22 to remove the deposited titanium from the surface onto which it was deposited. Substrate 20 may comprise a titanium wire screen or a titanium sheet has a contoured surface formed, for example, by machining or etching, to a geometric shape that is desired for the deposited particles, for example half round columns 24 (see FIG. 4). Another approach to forming the substrate 20, shown in FIG. 5, is to selectively bundle together a plurality of wires 26 with their ends 28 facing the deposition zone in which titanium will be deposited on the ends of the wires and the deposit removed by passing the wires under a blade 30 that removes or scrapes off the deposited titanium. The deposition substrate may be moved through the deposition zone in a step-wise or continuously, whereby titanium may be removed as it is produced by the reaction of magnesium and $TiCl_4$ vapors, under temperature and pressure conditions such that no liquid can condense on the surface of the substrate.

Figure 6:
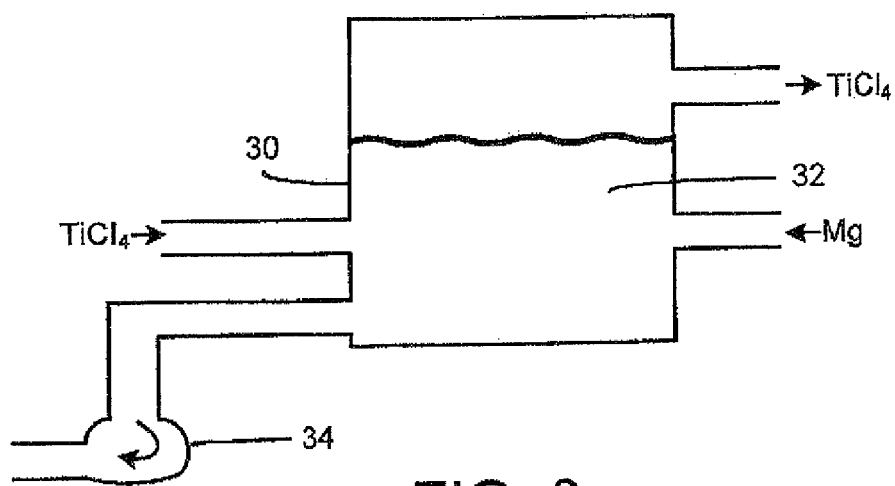
FIG. 6 is a view similar to FIG. 1 of an alternative reaction system for practicing the present invention; and, FIG. 7 is a view similar to FIG. 6 of yet another alternative embodiment of the present invention.

Yet another alternative embodiment is illustrated in FIG. 6, in which we mix gaseous magnesium vapors with $TiCl_4$ gas within a reactor 30 containing molten salt bath 32 such as $CaF_2$. The temperature of the molten salt bath 32 should be sufficiently high to maintain the magnesium in a gaseous state. At atmospheric pressure within the molten salt bath 32, magnesium boils at approximately 1097-1107° C. Thus the molten salt bath 32 should be operated to at least the boiling point of magnesium. The by-product of the reaction is $MgCl_2$ which should be continuously removed from the molten salt bath as a vapor. $MgCl_2$ boils at approximately 1412° C. Thus if the molten salt bath such as $CaF_2$ is operated at above 1412° C. the magnesium chloride will continuously boil and vaporize out of the molten salt bath where the $MgCl_2$ vapor may be collected and recycled for electrolysis to produce more magnesium reductant feed.

Figure 7:
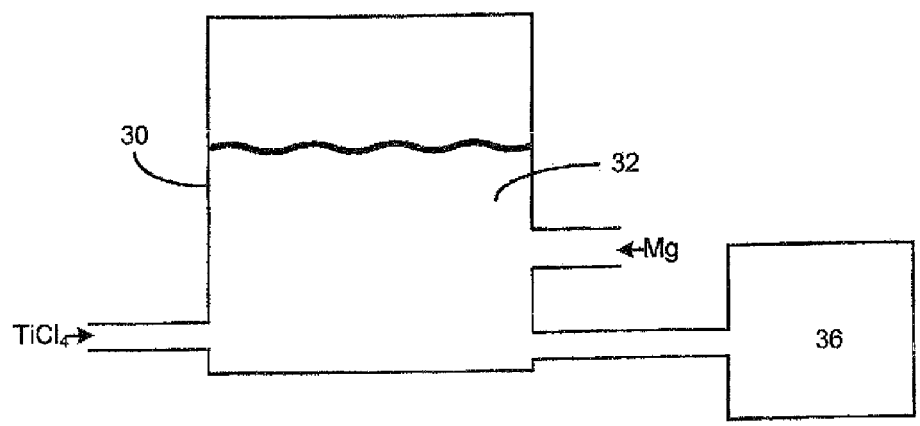

At temperatures less than the melting point of titanium when the gaseous Mg and $TiCl_4$ react, particles of titanium are produced which sink to the bottom of the molten salt bath since titanium is heavier than molten salts such as $CaF_2$. The solid particles of titanium can then be siphoned from the bottom of the reactor using, for example, gas pumping or a negative pressure pump 34. As before the by-product is $MgCl_2$ which will vaporize in the molten salt bath provided the bath is operated above the boiling point of $MgCl_2$, i.e. above 1412° C., which vapor can be collected and recycled for electrolysis to produce the required magnesium reductant feed. Yet another alternative embodiment is illustrated in FIG. 7. Here the molten salt bath, such as $CaF_2$, is operated above the melting point of titanium (approximately 1670° C.). Under these conditions the reaction between magnesium and $TiCl_4$ vapor produces titanium in a molten state. The molten titanium is then withdrawn from the reactor, passed through to freeze zone 36, and removed as a solid ingot on a continuous basis.

While the invention has been described in connection with the production of titanium, other high value metals of interest such as chromium, hafnium, molybdenum, niobium, tantalum, tungsten, vanadium and zirconium may be produced by metallothermic reduction of the corresponding chloride in the gaseous state to produce the metal of interest.

Yet other changes may be made without departing from the spirit and scope of the invention.

What is claimed is:

1. A method for the production of titanium by the metallothermic reduction reaction of $TiCl_4$ in gaseous state, which comprises conducting the reaction in a fluidized bed reaction zone to produce titanium particles, collecting the particles on a substrate, vibrating or flexing the substrate so that particles fall back into the reaction zone, and continuously recycling particles to the reaction zone to build up particle size.

2. The method of claim 1, comprising withdrawing titanium particles from the reaction zone once they achieve a pre-determined size.

3. The method of claim 1, wherein the substrate comprises a screen or sheet.

4. The method of claim 3, wherein the screen or sheet is formed of titanium.

5. The method of claim 3, wherein the sheet has a contoured surface.

6. The method of claim 5, wherein the contoured surface is formed by machining or etching.

7. The method of claim 5, wherein the sheet has a plurality of half-round columns formed in a surface thereof.

8. The method of claim 1, wherein the particles are deposited on a substrate, and including the step of scraping the deposit from the substrate.

9. The method of claim 8, wherein the substrate comprises a bundle of wires, and the particles are deposited on the ends of the wires.

10. The method of claim 1, wherein the fluidized bed is pulse fluidized.

11. A method for the production of titanium which comprises reacting gaseous $TiCl_4$ and Mg in a molten salt reactor, wherein the titanium produced is in a molten state, and including the steps of solidifying the molten titanium by passing the molten titanium to a cooling zone, and collecting the solidified titanium from the cooling zone.

12. The method of claim 11, and including the step of removing the solidified titanium from the cooling zone.

13. The method of claim 11, wherein the molten salt comprises calcium fluoride.

14. The method of claim 11, wherein $MgCl_2$ is produced as a by-product, and including the steps of passing the by-product $MgCl_2$ to electrolysis where the Mg is recovered and recycled to the molten salt reactor.

15. The method for the production of a metal of interest by metallothermic reduction reaction of a metal chloride in a gaseous state, which comprises conducting the reaction in a fluidized bed reaction zone to form particles of the metal of interest, collecting the particles on a substrate, vibrating or flexing the substrate so that particles fall back into the reaction zone, and continuously recycling particles to the reaction zone to build up particle size; wherein the metal of interest is selected from the group consisting of the chromium, hafnium, molybdenum, niobium tantalum, tungsten, vanadium and zirconium.

16. The method of claim 15, comprising withdrawing metal particles of interest from the reaction zone once they achieve a pre-determined size.

17. The method of claim 15, wherein the substrate comprises a screen or sheet.

18. The method of claim 17, wherein the screen or sheet is formed of the metal of interest.

19. The method of claim 17, wherein the sheet has a contoured surface.

20. The method of claim 19, wherein the contoured surface is formed by machining or etching.

21. The method of claim 19, wherein the sheet has a plurality of half-round columns formed in a surface thereof.

22. The method of claim 15, wherein the fluidized bed is pulse fluidized.

23. The method of claim 15, wherein the particles are deposited on a substrate, and including the step of scraping the deposit from the substrate.

24. The method of claim 23, wherein the substrate comprises a bundle of wires, and the particles are deposited on the ends of the wires.

25. The method of claim 24, wherein the metal of interest is produced in a molten state, and including the steps of solidifying the molten metal of interest by passing the molten metal of interest to a cooling zone, and collecting the solidified metal of interest from the cooling zone.

26. A method for the production of a metal of interest by metallothermic reduction reaction of a metal chloride in a gaseous state, which comprises reacting gaseous metal chloride and Mg in a molten salt reactor, wherein the metal of interest produced is in a molten state, and including the steps of solidifying the molten metal of interest by passing the molten metal of interest to a cooling zone and collecting the solidified metal of interest from the cooling zone, and wherein the metal of interest is selected from the group consisting of chromium, hafnium, molybdenum, niobium, tantalum, tungsten, vanadium, and zirconium.

27. The method of claim 26, wherein the molten salt comprises calcium fluoride.

28. The method of claim 26, wherein $MgCl_2$ is produced as a by-product, and including the steps of passing the by-product $MgCl_2$ to electrolysis where the Mg is recovered and recycled to the molten salt reactor.

* * * * *